(12) United States Patent
Wood et al.

(10) Patent No.: US 7,172,408 B2
(45) Date of Patent: Feb. 6, 2007

(54) RAPID DENSIFICATION OF POROUS BODIES (PREFORMS) WITH HIGH VISCOSITY RESINS OR PITCHES USING A RESIN TRANSFER MOLDING PROCESS

(75) Inventors: Michael D. Wood, South Bend, IN (US); Frank Dillon, Granger, IN (US); Richard A. Heckelsberg, Niles, MI (US); Roger W. Holloway, North Liberty, IN (US); Mark L. LaForest, Granger, IN (US); Neil Murdie, South Bend, IN (US); Charles A. Parker, Granger, IN (US); James F. Pigford, Kingwood, TX (US)

(73) Assignee: Honeywell International, Inc., Morristown, NJ (US)

( * ) Notice: Subject to any disclaimer, the term of this patent is extended or adjusted under 35 U.S.C. 154(b) by 365 days.

(21) Appl. No.: 10/342,042

(22) Filed: Jan. 14, 2003

(65) Prior Publication Data

US 2003/0111752 A1 Jun. 19, 2003

Related U.S. Application Data

(62) Division of application No. 09/653,880, filed on Sep. 1, 2000, now Pat. No. 6,537,470.

(51) Int. Cl.
*B29C 45/00* (2006.01)

(52) U.S. Cl. .................. 425/557; 425/116; 425/129.1; 425/546

(58) Field of Classification Search ................ 425/557, 425/116, 129.1, 546
See application file for complete search history.

(56) References Cited

U.S. PATENT DOCUMENTS 4,412,804 A * 11/1983 Huther ........................ 425/546
4,986,943 A 1/1991 Sheaffer et al.

(Continued)

FOREIGN PATENT DOCUMENTS

SU 383614 A * 8/1973

OTHER PUBLICATIONS

Typical textbook chapter on RTM Theory.*

*Primary Examiner*—Robert Davis
*Assistant Examiner*—G. Nagesh Rao
(74) *Attorney, Agent, or Firm*—Birch, Stewart, Kolasch & Birch, LLP

(57) ABSTRACT

A resin transfer molding (RTM) process is disclosed for rapidly filling a fibrous preform and/or a rigid, porous body with high viscosity resin or pitch. The process is suitable for impregnated multiple porous bodies stacked in a single mold. The process uses a fibrous preform or rigid porous body which is placed into a mold matching the desired part geometry. A resin is injected into the mold at temperature and pressure. After cooling, the infiltrated component is removed from the mold. The mold is constructed from two halves fitted to form at least one mold cavity. A gate fitted with a nozzle is set into one of the mold halves, and a valve admits resin or pitch into the gate area. Venting or vacuum can be applied to the mold. The mold is held in a hydraulic press and an extruder, optionally fitted with an accumulator, supplies molten resin or pitch to the mold.

12 Claims, 9 Drawing Sheets

U.S. PATENT DOCUMENTS

| | | |
|---|---|---|
| 5,059,370 A | 10/1991 | Kojima |
| 5,229,144 A * | 7/1993 | Kuntz .................... 425/557 |
| 5,248,467 A | 9/1993 | Cushman |
| 5,306,448 A | 4/1994 | Kromrey |
| 5,362,226 A * | 11/1994 | Kataoka et al. ............ 425/526 |
| 5,654,059 A | 8/1997 | Hecht |
| 5,770,127 A * | 6/1998 | Abrams et al. ............ 264/29.1 |
| 5,773,042 A * | 6/1998 | Amano et al. ............. 425/207 |
| 5,804,230 A * | 9/1998 | Hasegawa et al. .......... 425/557 |
| 5,897,883 A * | 4/1999 | Cho et al. .................. 425/116 |
| 6,325,608 B1 | 12/2001 | Shivakumar et al. |

\* cited by examiner

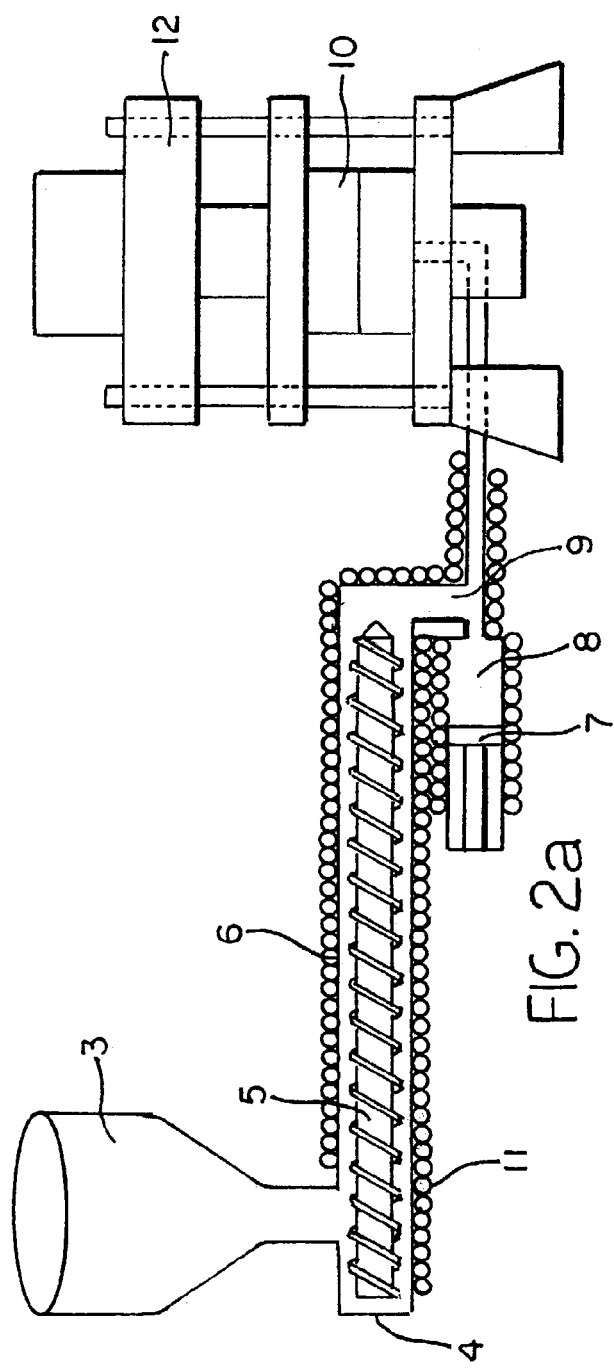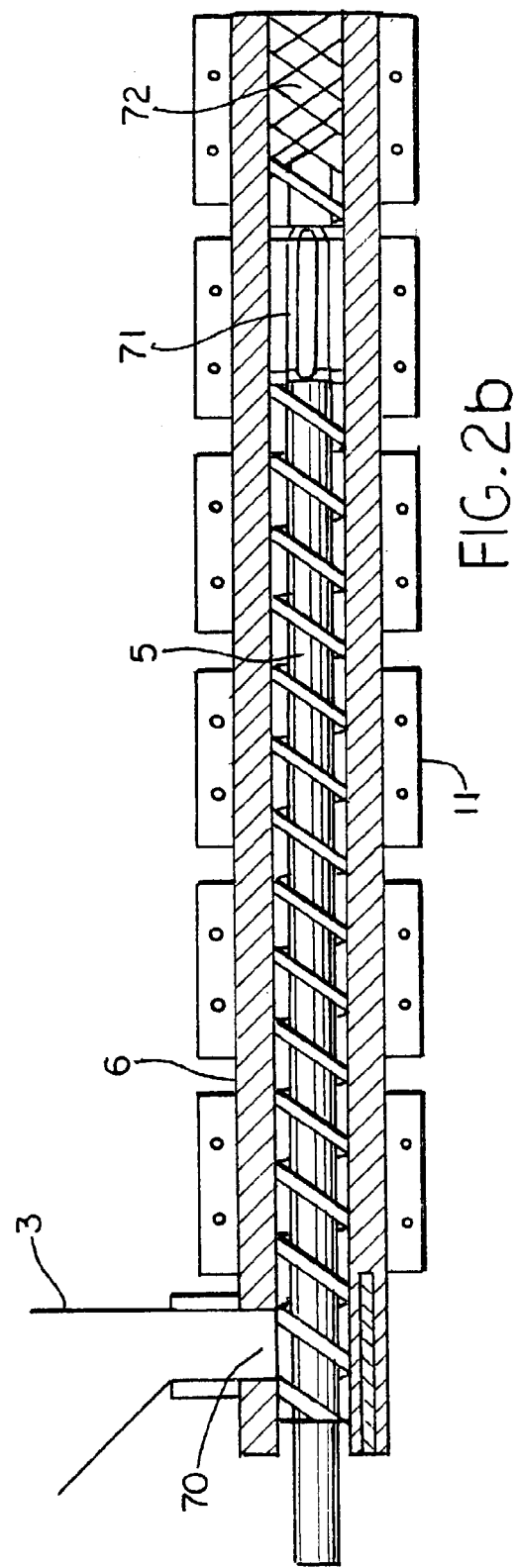

PROCESSING WINDOW FOR PITCH IMPREGNATION AS A FUNCTION OF TEMPERATURE.

RAPID DENSIFICATION OF POROUS BODIES (PREFORMS) WITH HIGH VISCOSITY RESINS OR PITCHES USING A RESIN TRANSFER MOLDING PROCESS

CROSS REFERENCE TO RELATED APPLICATION

This application is a divisional of application Ser. No. 09/653,880 filed Sep. 1, 2000 now U.S. Pat. No. 6,537,470, the entire contents of which is hereby expressly incorporated by reference.

TECHNICAL FIELD AND INDUSTRIAL APPLICABILITY OF THE INVENTION

The invention is directed toward an improved process to rapidly densify high temperature materials including carbon-carbon ("C—C") composites and porous preforms with a high viscosity resin or pitch using resin transfer molding techniques.

BACKGROUND OF THE INVENTION

The present invention describes an improved process for the rapid densification of high temperature materials including C—C composites, carbon and ceramic fiber reinforced preforms as well as carbon and ceramic foams.

Typically, these high temperature materials are densified using CVD/CVI (Chemical Vapor Deposition/Chemical Vapor Infiltration) of carbon and/or ceramic, or liquid infiltration with a resin and/or pitch as well as their combinations. The CVD/CVI process is highly capital intensive and suffers from long cycle times with multiple densification cycles typically taking several weeks to complete.

The impregnation of porous bodies with resins and pitches typically involves vacuum/pressure infiltration (VPI). In the VPI process a volume of resin or pitch is melted in one vessel while the porous preforms are contained in a second vessel under vacuum. The molten resin or pitch is transferred from vessel one into the porous preforms contained in the second vessel using a combination of vacuum and pressure. The VPI process is limited to using resin and pitches that possess low viscosity and associated low carbon yields. Therefore, densification of porous preforms with liquid resin and pitch precursors using the VPI process typically requires several cycles of impregnation followed by carbonization (frequently up to 7 cycles) and require long cycle times up to several weeks to achieve the desired final density.

To avoid the long cycle times associated with using low char-yield resins and pitches in typical VPI processes, high pressure impregnation/carbonization (PIC) is used to increase the carbon yield of pitches. Typical high-pressure carbonization cycles are in excess of 5000 psi and frequently 15000 psi. The resulting high char yield achieved with high-pressure carbonization allows the number of densification cycles to be reduced from 6–7 cycles to 3–4 cycles to achieve equivalent densities. However, the high-pressure vessels are capital intensive and of limited size thereby limiting the number of preforms densified in one vessel. The high pressures used also increase the risk of explosion and special safety precautions are required to meet safety standards.

An alternative approach to improve the efficiency of carbon densification processes involves the use of liquid resins with high carbon-yield (>80%). Typical high char-yield resins include synthetic mesophase pitches (e.g. AR mesophase pitch from Mitsubishi Gas Chemical Company, Inc., catalytically polymerized naphthalene) as well as thermally or chemically treated coal tar and petroleum derived pitches and other thermoplastic resins. However, there are many problems associated with using these high char yield resins in the current VPI processes related to their higher viscosity and associated higher process temperatures.

The present invention provides solutions to the above issues and provides a method to provide higher density composites with reduced cycle time. The present invention makes use of Resin Transfer Molding (RTM) technologies combined with high char yield resins to densify porous preforms within a matter of minutes.

RTM processes are not new. In recent years, resin transfer molding, or RTM, and its derivative processes (which are also called resin injection molding) have gained popularity in the aerospace, automotive, and military industries as a means of densification of porous preforms. In fact, RTM was originally introduced in the mid 1940s but met with little commercial success until the 1960s and 1970s, when it was used to produce commodity goods like bathtubs, computer keyboards and fertilizer hoppers.

RTM is typically used for the production of polymer-based composites. A fibrous preform or mat is placed into a mold matching the desired part geometry. Typically, a relatively low viscosity thermoset resin is injected at low temperature (100–300° F., 38–149° C.) using pressure or induced under vacuum, into the porous body contained within a mold. The resin is cured within the mold before being removed from the mold.

RTM has been shown to be uniquely capable of satisfying the low-cost and high volume (approximately 500–50,000) parts per year requirements of the automotive industry as well as the higher performance/lower volume (approximately 50–5,000) parts per year of the aerospace industry. Variations of the RTM process make it well suited for the production of large, complex thick-sectioned structures for infrastructure and military applications. An example of this is the lower hull of the Army Composite Armored Vehicle (CAV). The automotive industry has been using RTM for decades.

U.S. Pat. No. 5,770,127 describes a method for making a carbon or graphite reinforced composite. A rigid carbon foam preform is placed within a sealed flexible bag. A vacuum is created within the bag. Matrix resin is introduced into the bag through an inlet valve to impregnate the preform. The preform is then cured by heating. The resulting carbon or graphite structure is then removed from the bag.

U.S. Pat. No. 5,306,448 discloses a method for resin transfer molding which utilizes a reservoir. This reservoir comprises a pressure yielding porous sponge containing from about two to ten times the sponge's weight in resin. The resin reservoir facilitates resin transfer molding by providing a resin reservoir that can ensure the desired impregnation of a porous preform such as a porous fiber reinforced composite.

U.S. Pat. No. 5,654,059 discloses the fabrication of thick, three-dimensional mat structures comprising discontinuous thermoset pitch fiber, with needlepunch openings at least 80% through the structure.

U.S. Pat. No. 4,986,943 discloses a method for oxidation stabilization of pitch-based matrices for carbon-carbon composites. In this method, a lattice-work of carbon fibers is infiltrated with a pitch based matrix precursor, oxidized in an oxygen-containing atmosphere at a temperature below the pitch softening point, and carbonized to convert the matrix material into coke.

In typical extrusion processing of resins and plastics, a viscous melt is forced under pressure through a shaping dye in a continuous stream. The feedstock may enter the extrusion device in the molten state, but more commonly it consists of solid particles that must be subjected in the extruder to melting, mixing, and pressurization. The solid feed may be in the form of pellets, powder, beads, flake or reground material. The components may be premixed or fed separately through one or more feed ports.

Most extruders incorporate a single screw rotating in a horizontal cylindrical barrel with an entry port mounted over one end (feed end) and a shaping die mounted at the discharge end (metering end). A series of heaters can be located along the length of the barrel to separate the extruder into discrete heating zones. In typical extrusion applications a shaping die is used to form a fiber, rod or other shape. In RTM processes the shaping die can be replaced with a mold containing a porous body or preform.

Twin screw extruders are used less than single screw extruders, but they are widely employed for difficult compounding applications, devolatilization, and for extruding materials having high viscosity and limited heat stability. Twin screw designs can be either counterrotating or co-rotating, and the screw can be fully intermeshing, partially intermeshing or not intermeshing. Extrusion technology known in the art is discussed in *Concise Encyclopedia of Polymer Science and Engineering,* Jaqueline I. Kroschwitz, Ed., John Wiley & Sons, 1990, p. 363–367; and *Principles and Plasticating Extrusion,* Z. Tadmore and I. Klein, Van Nostrand Reinhold, New York, 1970.

Although the use of high char-yield resins provide the potential for improved carbon yield and reduced number of densification cycles required to achieve final density their use in VPI and RTM processes have been unsuccessful. Utilization of the high char yield resins in VPI processes has been restricted because the high char-yield resins have high viscosity and higher temperatures are required to lower the viscosity of the resin and pitch for impregnation. The higher processing temperatures and higher viscosity of the high char-yield resins lead to the following problems with existing VPI and RTM processes.

1) The resins begin to cure in the holding vessels prior to impregnation.
2) Higher pressures are required for impregnation of the high viscosity resin.
3) Non-uniform and incomplete infiltration of the resin into the porous body or preform leading to dry spots (porosity) caused by encapsulation of air pockets in the preforms.

The successful use of high char-yield resins in RTM processes would provide significant reductions in the densification cycle time of composite materials compared with existing CVD/CVI and VPI processes by reducing the number of impregnation cycles to achieve the required final density. In addition, the use of high char yield resins in RTM processes would also provide a reduction in resin waste (90% utilization of resin)

The successful use of high char yield resins in RTM processes requires several innovations including:
1) Means to provide efficient, uniform flow of the high viscosity resin into and throughout the preform.
2) Means to prevent the formation of dry pockets caused by a combination of incomplete impregnation of resin and entrapment of air and volatiles in the preform, and thereby maximize densification efficiency.

The prior art demonstrates the need for a method and apparatus for impregnating a porous preform with high viscosity molten resin (for example AR mesophase pitch) at high temperatures. The resulting impregnated preform is preferably free from "dry spots" and has the ability to undergo further processing such as oxidative stabilization, carbonization and graphitization.

SUMMARY OF THE INVENTION

The present invention, in part, provides a rapid, discrete infiltration of a porous fibrous preform or a rigid porous body using high viscosity, high char-yield resin (for example mesophase pitch).

The present invention, in part, provides an apparatus and method for the utilization of high viscosity mesophase pitch to densify a rigid body.

The present invention, in part, also provides an extruder or similar apparatus to uniformly melt and mix the injection media (high viscosity resin). The extruder can be either a single screw or a twin screw extruder. A single screw extruder is preferred due to its lower cost.

The present invention, in part, also provides an extruder which may be fitted with an accumulator to hold a controlled volume of molten resin before injecting the controlled volume of resin under pressure into a mold. An advantage of the present invention is that it provides a resin transfer molding method which eliminates resin waste.

The present invention, in part, also provides a hydraulic press to constrain a mold containing the porous preform or rigid porous body.

The present invention, in part, also provides a mold which efficiently distributes the resin uniformly throughout the preform.

The present invention, in part, provides for a mold that may be oriented horizontally within the press. A gate, having a nozzle, can be disposed in the center of a face of a mold half. The mold can have tapered cavities to promote adequate molten resin flow.

The present invention, in part, also pertains to a resin transfer molding process that comprises: placing a porous preform into a mold; injecting a molten resin or pitch into the mold; allowing the resin or pitch to cool below the melting point; and removing the impregnated preform from the mold, wherein the mold comprises a top half; a bottom half opposed to the top half so that the top half and the bottom half form a mold cavity; at least one gate disposed in the top half or the bottom half; a valve that can admit resin into the gate; and an arrangement for providing venting and/or vacuum to the mold.

The porous body can be a fibrous preform, a carbon or ceramic fiber preform, a nonwoven preform, a rigidized fibrous preform, a porous carbon or ceramic body, or a foam preform or a rigidized foam preform. The preform can be carbonized or graphitized. The preform can be infiltrated using CVD/CVI. The preform can be previously resin infiltrated. The preform can be heated to a temperature between about 290–425° C. (554–797° F.) either prior to or after being placed in the mold. The preform can be heated to a temperature above the resin or pitch melting point. The mold is heated to a temperature between about 138–310° C. (280–590° F.). The resin or pitch can be a derivative of coal tar, petroleum or synthetic pitch precursors such as synthetic pitch, coal tar pitch, petroleum pitch, mesophase pitch, high char yield thermoset resin or combinations thereof. Multiple parts can be loaded in a single mold.

Further, according to a part of the invention, the densified part, following densification, can be treated at elevated temperature in an oxygen containing environment to effectively cross-link the thermoplastic resin. This process, similar to that practiced in the production of pitch-based carbon fiber, fixes the matrix in place within the preform and prevents softening, bloating and expulsion of the matrix during subsequent heating above the resin melting temperature. The oxygen stabilization can entail heating the densified part in the presence of oxygen to a temperature less than the softening point of the resin (302–482° F., 150–250° C.), typically 338° F. (170° C.). Additional treatments of the densified part can include carbonization, graphitization, and reimpregnation using RTM or CVD/CVI.

Objectives, features and advantages of the invention will be more fully apparent from the following detailed description of the preferred embodiments, the appended claims and the accompanying drawings.

BRIEF DESCRIPTION OF THE DRAWINGS

The present invention will become more fully understood from the detailed description given hereinbelow and the accompanying drawings which are given by way of illustration only, and thus do not limit the present invention. The drawings are not drawn to scale.

FIG. 2a shows an extrusion resin molding apparatus according to an embodiment of the present invention.

FIG. 2b shows in detail the extruder of the molding apparatus.

DESCRIPTION OF THE PREFERRED EMBODIMENTS

A method of rapidly densifying a porous body or preform (for example a carbon fiber reinforced preform or a porous rigidized preform) involves single or multiple infiltration and carbonization steps using a high carbon yield, high viscosity resin. The infiltration medium can be coal tar pitch, petroleum pitch, mesophase pitch, high char yield thermoset resin or combinations thereof. The attributes, alone or in combination, of the process according to the present invention (and relative to typical RTM) include:

a) the use of high melting point, high viscosity pitch or resin,
b) the use of a high char yield char yield pitch or resin,
c) the use of an extruder for on-line melting and mixing,
d) the use of relatively thick parts,
e) the use of carbon foam preforms,
f) the use of rigid, porous bodies,
g) attainment of rapid infiltration (on the order of seconds) of a part,
h) the use of cooler mold temperatures due to rapid infiltration,
i) the capability to foam the pitch or resin impregnant during RTM to create additional surface area to aid CVD/CVI, thermal properties or modify surface area,
j) the capability of imparting a flow structure when infiltrating with a liquid crystal such as mesophase pitch, and
k) the capability to compound other materials into the resin melt prior to infiltration.

The following examples describe the use of extrusion, accumulator and mold technologies combined to provide unique equipment and processes for the densification of porous bodies with high viscosity, high char-yield resins.

For the purpose of this application resin is defined as a thermoplastic or thermoset liquid precursor including for example phenolic, furfuryl, as well as pitches including those derived from coal tar, petroleum, synthetic, thermal treated and catalytic converted pitches, mesophase pitches, as well as pre-ceramic polymers such as Ceraset® available from Commodore Technologies, Inc.

For the purpose of this application a mold is defined as a containing vessel in which the porous body or preform is contained and into which infiltration of the resin occurs.

Figure 1A:
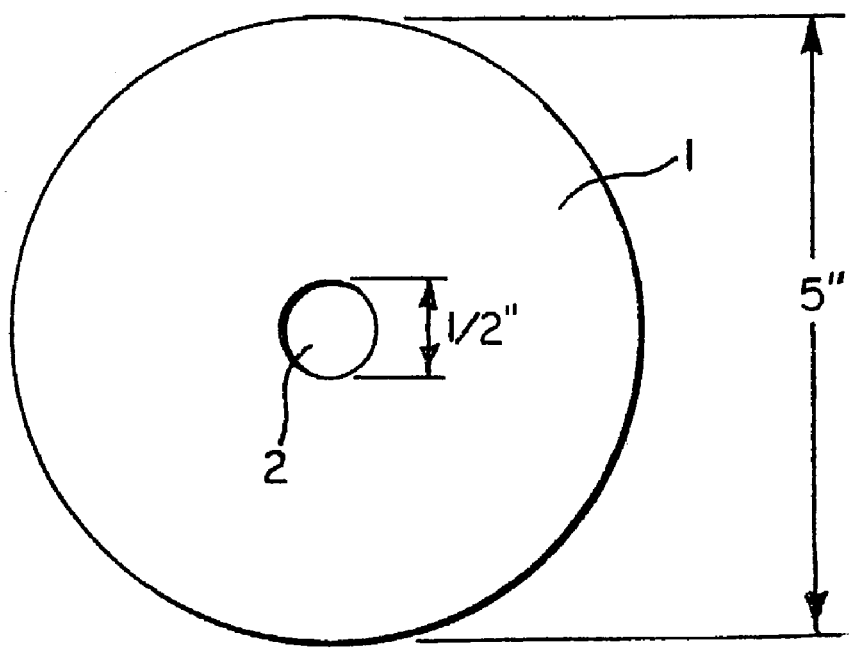
FIGS. 1a and 1b show overhead and side views of a fibrous preform that can be operated upon according to the present invention.
Figure 1B:
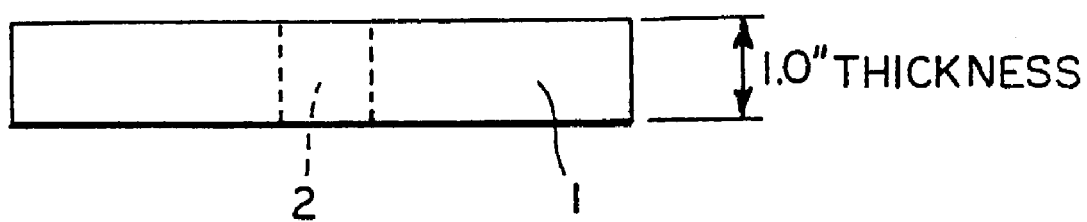

In the first two examples, a small-scale porous fibrous preform similar to that used in aircraft brake applications was densified with a high char-yield resin. FIGS. 1a and 1b show an overhead view and a side view of the fibrous preform used for these examples. Such a preform 1 can have a diameter of 5 inches. At the center of the preform 1 is a hole 2 that can have a diameter of 0.5 inches (1.27 cm) to several inches. The preform 1 can have a thickness of 1 inch (2.54 cm).

Initial experiments were performed using an extruder, e.g., a Killion extruder, fitted with an aluminum mold equipped with a small vent opening, e.g., a 0.031 inch (0.79 mm) die orifice to enable venting of entrapped air and volatiles from the preform during impregnation. This orifice was designed to maintain a back pressure on the mold at a given rpm of the extruder, thereby pressurizing the mold and enabling uniform infiltration of the porous preform with resin. Pitch powder or pellets were fed into the single screw extruder. The extruder was equipped with heating zones along the barrel. The resin (AR pitch) was melted in the extruder before being extruded directly into the heated mold.

EXAMPLE 1

A 35:1 length to diameter ratio Killion extruder with 5 heating zones along the barrel was coupled directly to a heated aluminum mold. The Extruder temperature profile was as follows:
Feed section=240° C. (464° F.) Zone 1
278° C. (532° F.) Zone 2
310° C. (590° F.) Zone 3
305° C. (581° F.) Zone 4

300° C. (572° F.) Zone 5
305° C. (581° F.) Die Zone
300° C. (572° F.) Mold

The fibrous preform was pre-heated in the mold for 2 hours until an internal temperature of 285° C. (545° F.) was reached prior to infiltration. The extruder screw was initially run at 20 rpm and reduced to 15 rpm during the run. The AR pitch resin was introduced into the extruder via a hopper and extruded into the porous fiber preform over a 2 hour period at 800–900 psi (5.52–6.21 MPa) melt pressure. The actual resin melt temperature was measured using a thermocouple located in the melt stream. The melt temperature during the infiltration was 318° C.–321° C. (604–610° F.) and is higher than the set-point temperatures of the extruder because of the additional shear energy imposed on the melt by the screw in the extruder. The extruder screw was turned on and off throughout the 2 hour run to maintain a melt pressure of 800–900 psi (5.52–6.21 MPa). After approximately 10 to 15 minutes, resin was observed exiting the 1/32" (0.79 mm) vent port located on the side of the mold.

After 2 hours, the mold was cooled and the heat source shut off. After the heat was off for about 30 minutes, the mold was disassembled and the part was removed. After removal, the part was cut in half and visually inspected. The part was almost fully filled with resin, but did contain a small dry region, and showed some signs of delamination between fabric layers.

While impregnation of the high viscosity resin into the porous preform was successful there were several areas for improvement identified, including:
1) Reduced impregnation time
2) Reduce the size of dry regions
3) Eliminate the tendency of the part to delaminate.

An RTM densification process to densify a CVD rigidized porous fibrous preform is shown in Example 2. CVD rigidization of the preform was performed to strengthen the porous preform and reduce the propensity for the fibrous preform to delaminate.

EXAMPLE 2

A non-woven porous preform was carbonized and exposed to one cycle CVD densification to rigidize the part prior to being infiltrated with resin.

The Killion extruder/mold system as described in Example 1 was used. A CVD rigidized fibrous pre-form 5 inches (12.7 cm) in diameter, 1 inch (2.54 cm) thick with a 0.5 inch (1.27 cm) hole drilled in the center was cut from a full size aircraft brake disc preform (Refer to FIGS. 1 and 2). The aluminum mold was 6 inches (15.24 cm) in diameter and 1 inch (2.54 cm) thick equipped with a 0.052 inch (1.32 mm) vent opening. The larger vent opening was used to improve the venting of resin (AR pitch) from the mold while keeping the extruder operating throughout the entire infiltration process. The objective was to keep the screw turning, maintain a constant pressure, provide a melt seal along the screw and reduce the overall run time from 2 hours to 15 minutes. The extruder settings are described below:
Feed section=240° C. (464° F.) Zone 1
278° C. (532° F.) Zone 2
310° C. (590° F.) Zone 3
310° C. (590° F.) Zone 4
305° C. (581° F.) Zone 5
305° C. (581° F.) Die
305° C. (581° F.) Die (added extra die controller)
305° C. (581° F.) Mold The part to be infiltrated was once again heated in the mold for 2 hours prior to starting the extruder. The resin (AR mesophase pitch) was fed from a hopper to the extruder. The resin was extruded for 15 minutes until the resin was observed exiting from the vent port. The mold was then cooled for 20 minutes. During the infiltration the pressure dropped from 850 psi (5.86 MPa) initially to 260 psi (1.79 MPa) due to a flange gasket leak in the mold.

The preform had an initial weight prior to infiltration of 0.815 pounds (369.7 g), and gained 0.172 pounds (77.9 g) for a final weight of 0.987 pounds (447.6 g). The initial density was 0.048 lb/in$^3$ (1.34 g/cc) and final density was 0.059 lb/in$^3$ (1.63 g/cc). The infiltrated preform was sectioned in half, and was completely filled except for one small dry region. The dry region may have been caused by the mold gasket leak and resulting drop in infiltration pressure. However, there was no evidence of any delamination in the CVD rigidized preform densified with high viscosity resin (AR mesophase pitch). The results from the initial resin transfer molding trials indicated that the infiltration of fibrous preforms with a high viscosity, high char-yield resin (AR mesophase pitch) is achievable using resin molding processes. The following description and the subsequent examples demonstrate the impregnation of larger preforms, typical of those used in aircraft brake applications, using the process and apparatus of the present invention.

FIG. 2a shows the resin transfer molding apparatus of the present invention. FIG. 2b shows the extruder in more detail. Raw material, typically AR mesophase pitch resin, marketed by Mitsubishi Gas Chemical Company, Inc., is loaded into a hopper 3 attached to an extruder 4. The extruder can be a single screw extruder, a twin screw extruder, a vented twin screw extruder or a reciprocating screw extruder. The extruder screw 5 can be either a single screw or double screw, but a single screw extruder is preferred for economic reasons. The extruder screw 5 feeds resin through the feed throat 70 and progressively heats the resin as it is transported down the length of the barrel 6. The maddock mixer 71 helps ensure a more homogeneous melt by adding mechanical work to the resin. The maddock mixer breaks up resin flow patterns, and it also improves the mixing of additives in a single screw extruder by applying shear to the material. The static mixer 72 contains static mixing elements. Stainless steel bars are welded together, acting as flow channels to carry the melted resin (and any other additives) from the center of the barrel to the wall of the barrel and back again. Each mixing element is rotated several degrees with respect to the adjacent element. The maddock mixer and static mixer elements at the end of the extruder screw enable the use of a single screw extruder by improving mixing of the resin melt and reducing temperature variation. The resin is then transported into an accumulator 8. The accumulator 8 can be a piston accumulator. The accumulator can also be a hydraulically actuated piston accumulator. The resin melt pressure created by the extruder forces the piston 7 inside the accumulator 8 back to the desired position. The invention can also be practiced by direct injection of the melt without the utilization of the accumulator 8 and the piston 7. Once the desired volume of resin has been accumulated, the accumulator piston 7 moves forward and forces the controlled volume of resin through the transfer pipe 9 into the mold cavity. An arrangement of valves (not shown) is provided in relation to the transfer pipe to control flow and backflow of the resin, respectively. The part to be infiltrated is contained within the mold 10. Mold temperature is controlled by using an oil circulator equipped with a heat exchanger. The extruder temperature is maintained by a series of water cooled cast aluminum heaters (11) and a series of temperature controllers (not shown).

The part to be infiltrated is preheated in an oven or within the mold cavity to a temperature at or above the resin melt temperature. The mold is contained or located within a press 12. The press 12 can be a hydraulic press. Although a vertically acting press is depicted in FIG. 2, a horizontally acting press could also be used. Also, the mold need not necessarily be located entirely within the press. The clamping force of the press 12, which is dependent on the size of part used (a 500 ton press was used in the examples cited) counteracts the pressure of the resin being forced into the mold cavity. The mold 10 is also heated. The infiltrated part remains within the mold 10 until the resin cools below the melting point, and the part is then removed.

One method of process operation involves evacuating the mold before and/or during infiltration. This method requires the mold to seal reasonably well and hold the vacuum. However, the use of a vacuum requires additional complexity and cost. The preferred method involves the mold designs shown in FIGS. 3, 4 and 5. The basis of these designs is that the resin flows freely around the ID, top and bottom of the porous preform or disc. The rings at the OD of the mold 20 and 21 (or narrow gap due to the taper, 30 and 31), in effect force the resin, as well as the air originally in the part and the volatiles coming off the resin, through the part and towards the vent 22 and 32 at the OD of the part formed by shimming the mold halves apart. If the mold is sealed and vacuum is not applied, the resin fully encapsulates the part and infiltrates from all sides. The air originally in the part, and the volatiles from the resin, are compressed to a smaller and smaller volume as resin fills the part and the pressure increases in the mold chamber. This eventually leads to a small porous region "dry spot" not impregnated by the resin. The mold design with tabs has been shown to eliminate the problem of dry spots in the part without the need for pulling a vacuum on the mold chamber.

Figure 3:
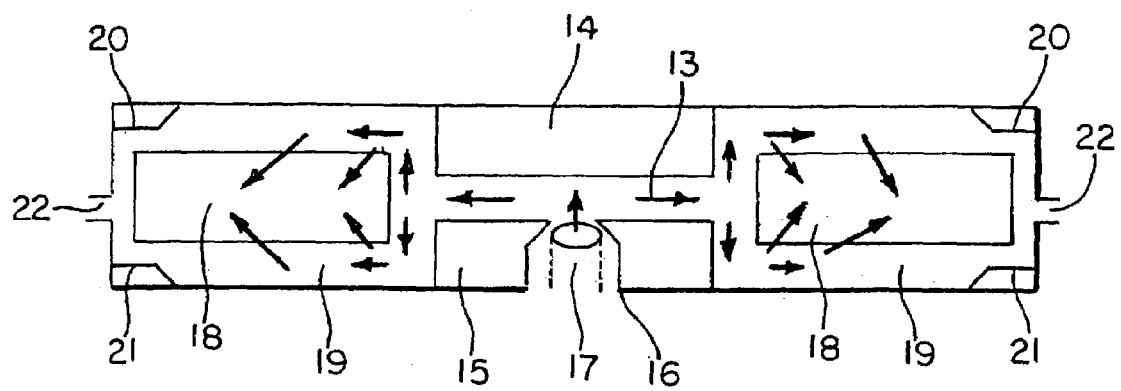
FIG. 3 shows a cross section of a mold according to an embodiment of the present invention, including a schematic of the resin flow around and through the preform.

FIG. 3 shows a cross section of a mold according to an embodiment of the present invention. The annular ring preform 18 is placed in the annular chamber 19. The annular mold chamber 19 is center fed through gate 13, controlled by the top gate 14 and the bottom gate 15. The bottom gate 15 is fitted with a nozzle 16 having a shut off rod 17. The annular chamber, 19 is fitted with two OD rings, 20 and 21, respectively. Each of the OD rings has an approximately ¼ to ½ inch (6.35–12.7 mm) overlap with the preform. The smaller clearance between the preforms and the OD rings facilitates the occlusion of the molten resin flow by creating a flow-resistance differential in the mold from the end having the OD rings 20 and 21, respectively, to the ID inlet (gate). The differential has greater flow resistance at the OD ring end, and lower flow resistance along the preform so that the high viscosity resin can effectively infiltrate the preform. The vent 22 eliminates trapped air, volatile gases and excess resin. Although the process can be performed with or without the utilization of vacuum, the process is so effective that no vacuum is required.

Figure 4:
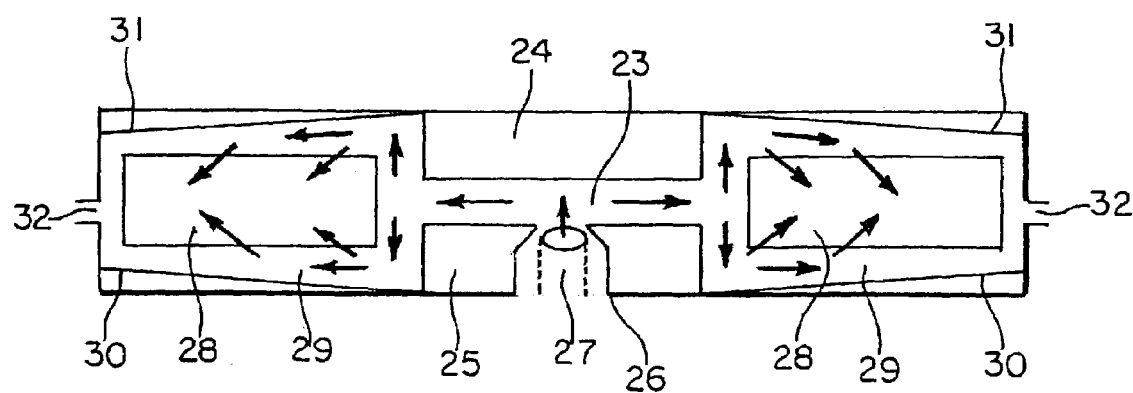
FIG. 4 shows a cross section of a tapered mold chamber according to an embodiment of the present invention, including a schematic of the resin flow around and through the preform.

FIG. 4 shows a cross section of a mold with a tapered chamber according to an embodiment of the present invention. The annular mold chamber 29 is center fed through gate 23, controlled by the top gate 24 and the bottom gate 25. The bottom gate 25 is fitted with a nozzle 26 having a shut off rod 27. An annular preform 28 is placed in the chamber 29 of the mold cavity. The chamber, 29 is fitted with tapered walls, 30 and 31, respectively. The direction of the taper of the top wall and the bottom wall is towards the center of the chamber as the chamber approaches a perimeter of the mold cavity. The smaller clearance between the tapered region and the outer edge of the preform at the OD of the mold restricts the flow, enabling the high viscosity resin to effectively infiltrate the preform in a manner similar to the way the embodiment of FIG. 3 achieves a flow resistance differential. Mold vent 32 eliminates trapped air, volatile gases and excess resin. Although the process can be performed with or without the utilization of vacuum, the process is so effective that no vacuum is required.

FIGS. 3 and 4 depict molds having only one chamber. Alternatively, the mold chamber could be designed to hold multiple porous bodies. The cavities (or chambers) represent a compromise of various competing design considerations, the relative priorities of which change from application to application.

Figure 5:
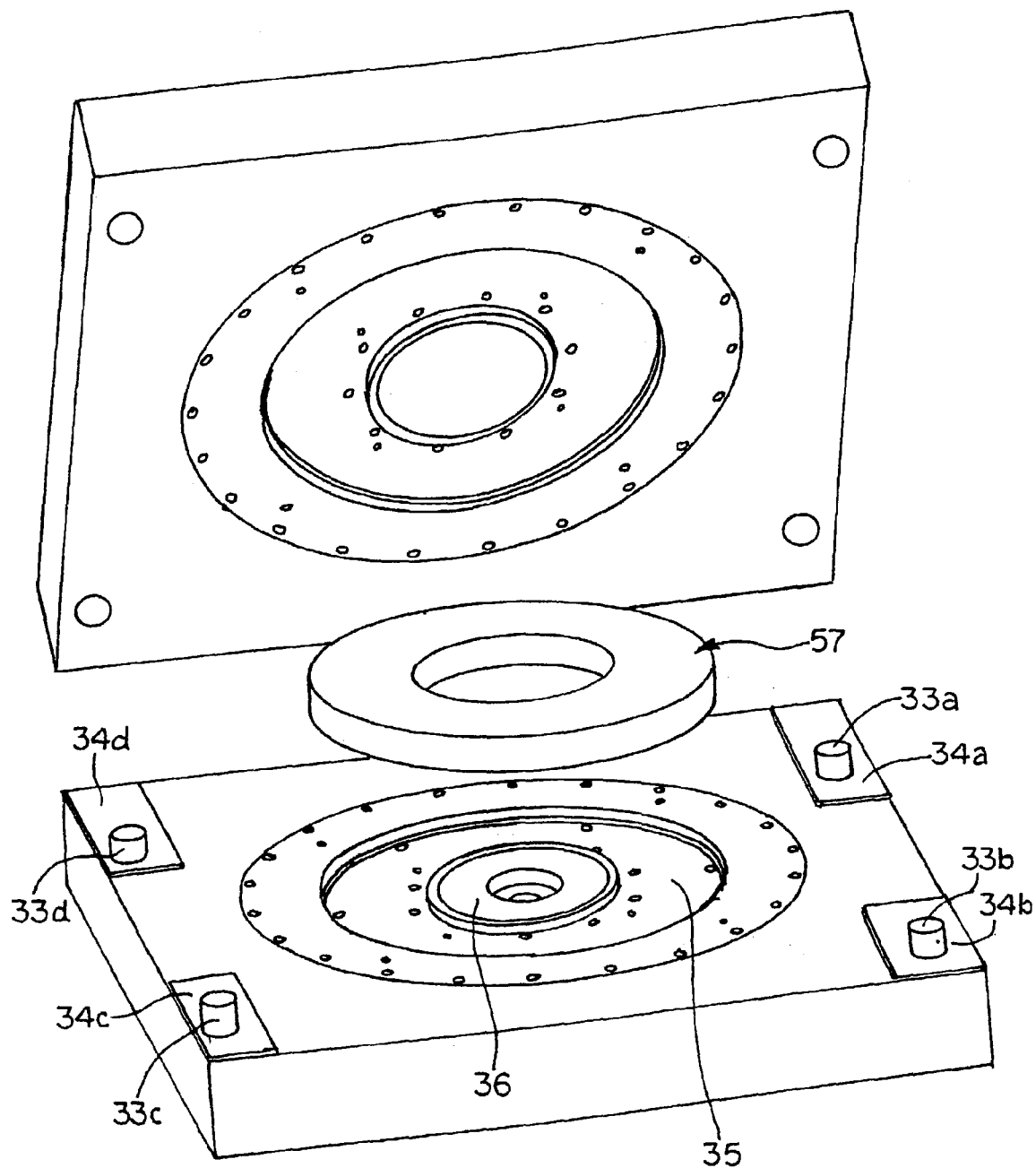
FIG. 5 shows the upper and lower mold halfs corresponding to the cross-sections of FIGS. 3 and 4 according to the present invention.

Venting is also performed through the mold surfaces. FIG. 5 is a view of the top and bottom halves of a single chambered, annular mold of an embodiment of the present invention. The bottom half of the mold has guide pins 33a, 33b, 33c and 33d to facilitate the alignment of the top and bottom halves of the mold. The central mold cavity 35 has a gate 36 for injection of the pitch or resin. Between the guide pins 33a, 33b, 33c and 33d and the mold chamber 43 is positioned shim stock 34a, 34b, 34c and 34d which enables even venting of atmosphere and volatiles from the mold cavity. The shim stock can have a thickness of 0.005" to 0.200" (0.13–5.1 mm). Alternatively, permanent spacers or machined grooves in the mold could be used to provide venting.

Venting is performed during the injection of resin into the mold. Alternately, vacuum can be provided to the mold prior to resin injection. A vacuum can also be provided to the mold during resin injection.

Figure 6:
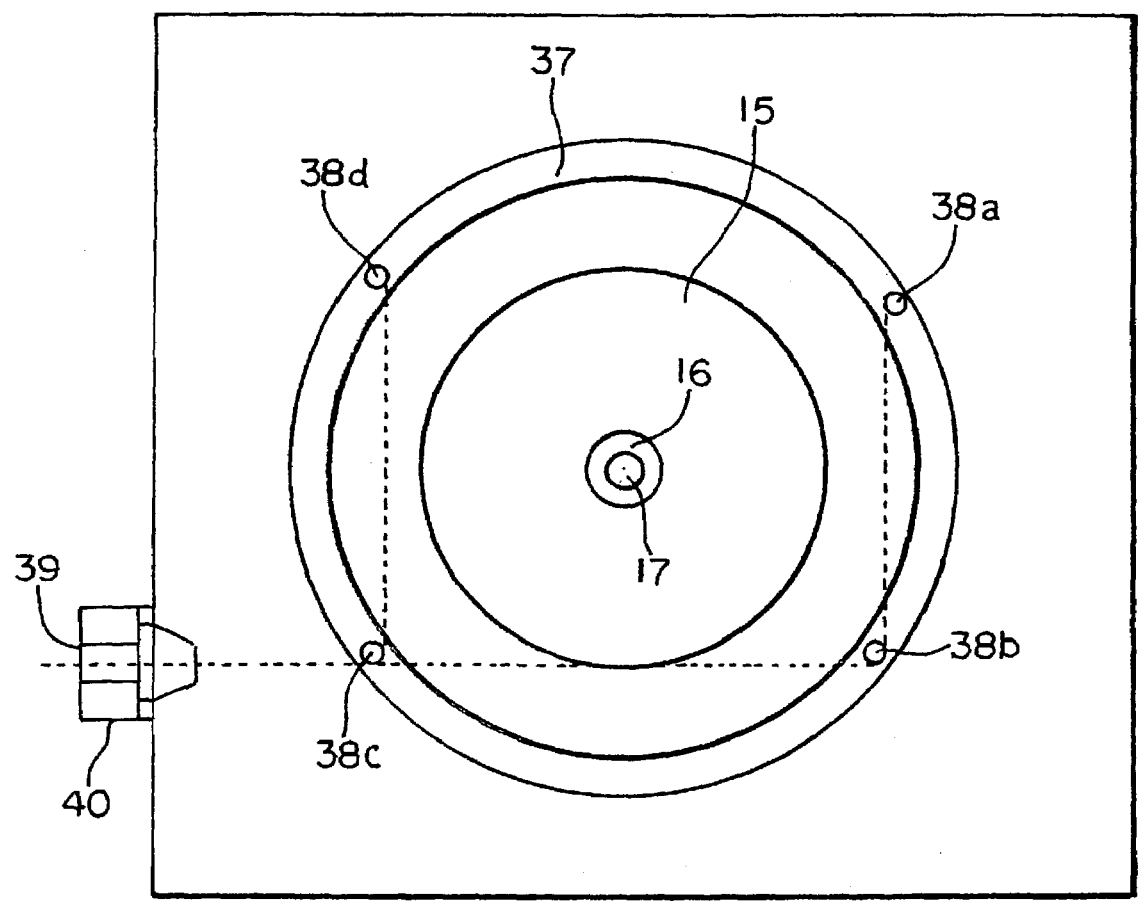
FIG. 6 shows an alternative embodiment of the bottom half of a mold according to the present invention.

FIG. 6 shows an overhead view of the bottom half the mold according to an embodiment of the present invention. A vent ring 37 is fitted with four vent ports 38a, 38b, 38c and 38d. The gate 15 is disposed in the mold chamber 29. The vent ports 38a, 38b, 38c and 38d are channeled to an external vent port 39 which can have, e.g., a 0.062 inch (1.6 mm) opening. A heater band 49 surrounds the vent port 48.

Figure 7:
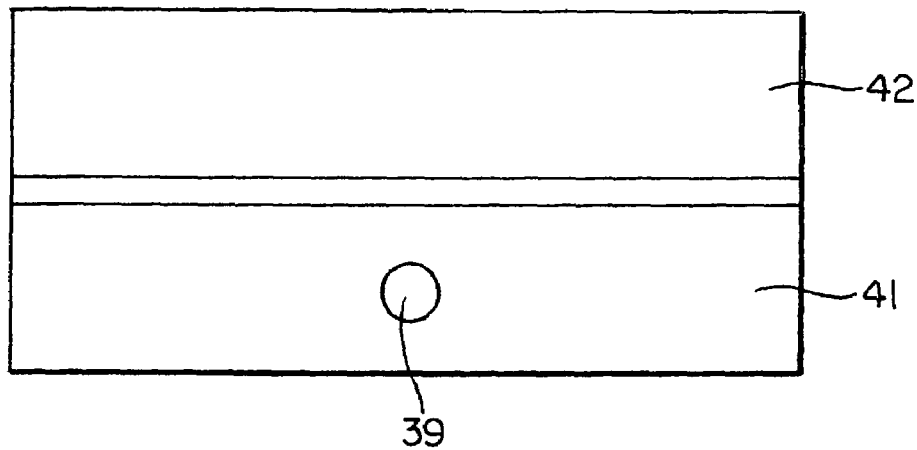
FIG. 7 shows a side view of a mold according to an embodiment of the present invention.

FIG. 7 is a side view of the mold according to an embodiment of the present invention. A bottom half of the mold 41 fits together with a top half of the mold 42 to form a complete mold assembly having a cylindrical chamber. The vent port 39 is located in the bottom half of the mold 41. The vent port 39 can have, e.g., either a 0.062 inch (1.6 mm) or a 0.125 inch (3.2 mm) diameter.

Figure 8:
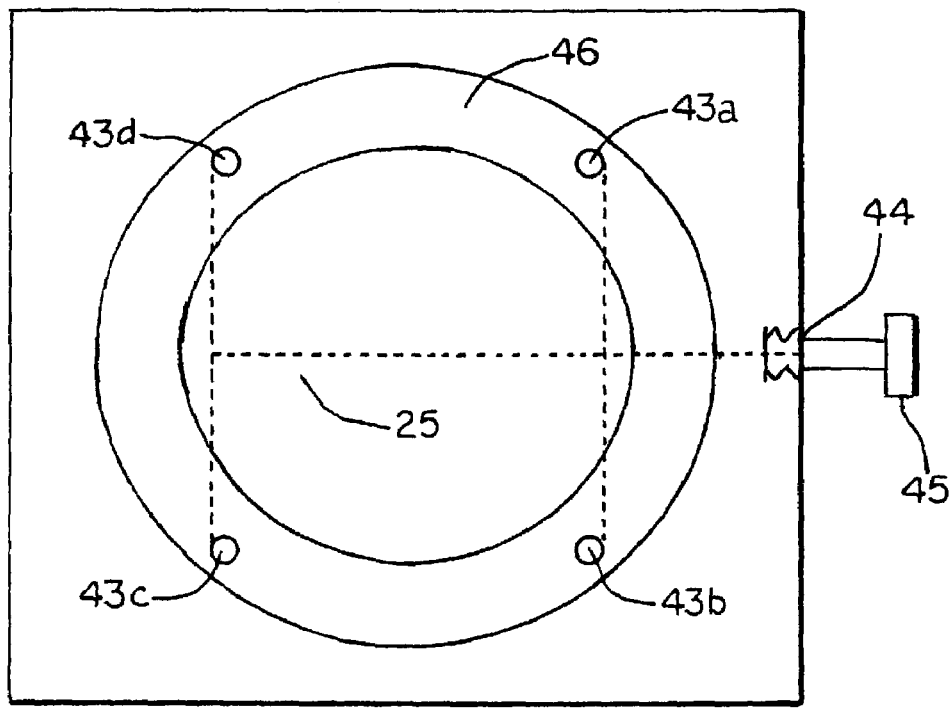
FIG. 8 shows an overhead view of another venting configuration for the bottom half of a mold according to an embodiment of the present invention.

FIG. 8 shows an overhead view of another venting configuration for the bottom half of the mold according to an embodiment of the present invention. The vent ports 43a, 43b, 43c and 43d are channeled to the external vent port 44. In this embodiment the vent port 44 is installed with, e.g., a 0.062 inch (1.6 mm) or 0.125 inch (3.2 mm) drilled bolt 45 for continuous venting. Internal vents 46 supply the offgas to the vent port 44.

As shown in FIG. 8, an additional modification was made to keep the mold chamber pressures uniform throughout the infiltration process and to aid in keeping molten pitch from entering the vent ports. This added feature involved threading the vent ports (inlets in the vent ring 46) 43a, 43b, 43c and 43d and inserting inserts with small orifices to create a pressure drop. This helps control cavity pressure (uniform during injection) and allows molten pitch to solidify (as the vent ports 43a, 43b, 43c and 43d have the surrounding mold as a heat sink) and not flow into the internal vents.

The present invention achieves preform densification with molten pitch by extrusion and injection of pitch. However, additional advantages can be realized when one considers that the extrusion and injection of pitch into the mold and preform using the injection unit to supply uniform pressure is a very rapid process. Injection of preforms happens quickly, on the order of less than a minute to a few seconds depending on the size of the preform. The injection process is quick enough to allow the attainment of much cooler mold temperatures, even below the resin melting point. However, the porous preform needs to be pre-heated to a temperature above the pitch softening point to allow the molten resin to flow, under pressure, into the preform. Industrial efficiency requires this process to be completed rapidly. Proper control of the pressure generation accelerates the infiltration process.

With proper pressure control, preforms can be impregnated more rapidly without generating extreme forces in the mold cavity that could cause the press to open during the impregnation process. The mold opens when the forces inside the mold chamber are greater than the applied tonnage of the clamp, taking into consideration the area of the mold chamber and the tonnage applied (e.g. 500 tons). The melt pressures during the impregnation process would be lower than, e.g., 3000 psi in the mold for aircraft brake disc preforms. This pressure is controlled through the hydraulic system and the mold venting, as shown in FIGS. 6–8.

Figure 9:
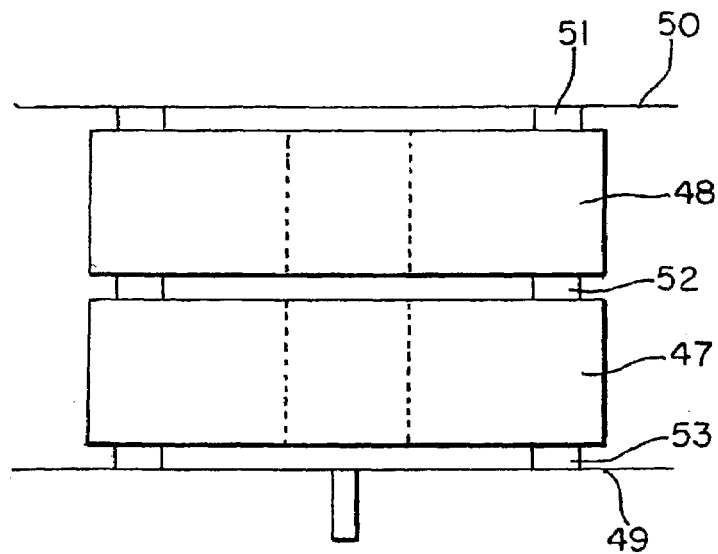
FIG. 9 shows a side-view of the configuration of two preforms in the mold cavity according to an embodiment of the present invention.

FIG. 9 shows the configuration of two preforms in the mold chamber according to an embodiment of the present invention. Bottom preform 47 and top preform 48 are stacked between the bottom mold surface 49 and the top mold surface 50. Mold surface spacers 51, 52 and 53 are placed between the preforms 47 and 48 and their respective corresponding mold surfaces 49 and 50. Stack spacers 52 are placed between the preforms. The mold surface spacers 51, 53 can be 0.125 inches (3.2 mm) thick and the stack spacers can be 0.062 inches (1.6 mm) thick.

Figure 10:
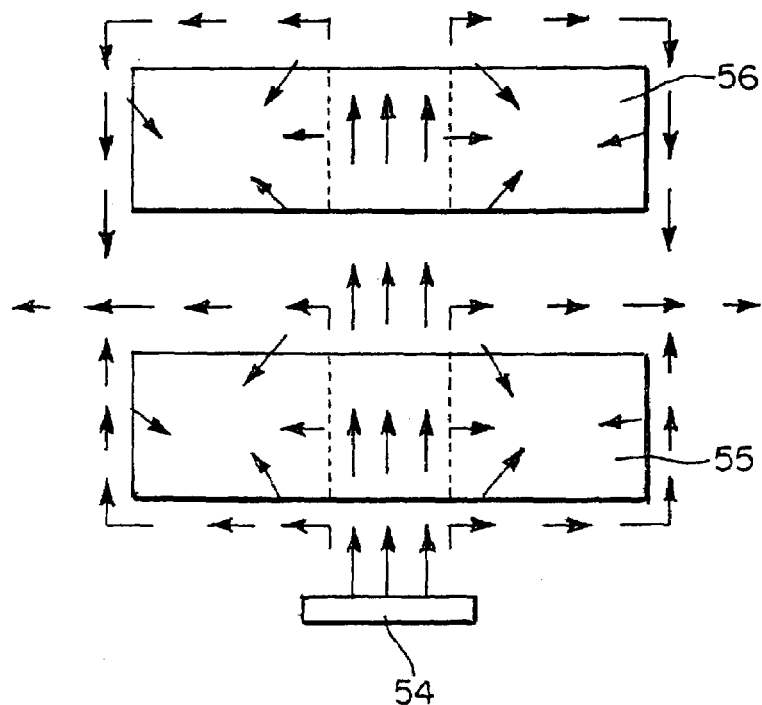
FIG. 10 shows a schematic of the flow of resin or pitch through the stacked preform according to an embodiment of the present invention.

FIG. 10 shows the flow of resin or pitch through the stacked preforms according to the present invention. Resin enters the mold from the gate 54 and flows evenly through and around the preforms 55 and 56 so as to afford a uniform impregnation of the preforms. The pitch flow lines away from the preforms are towards the vent ring (not shown).

The advantages of RTM densification over other, e.g. CVD, densification methods include rapid infiltration, more uniform density through thickness, ability to fill (densify) large internal porosity, and the attainment of higher final densities. The apparatus and method of the present invention results in the effective densification of preforms with high viscosity mesophase pitch.

Figure 11:
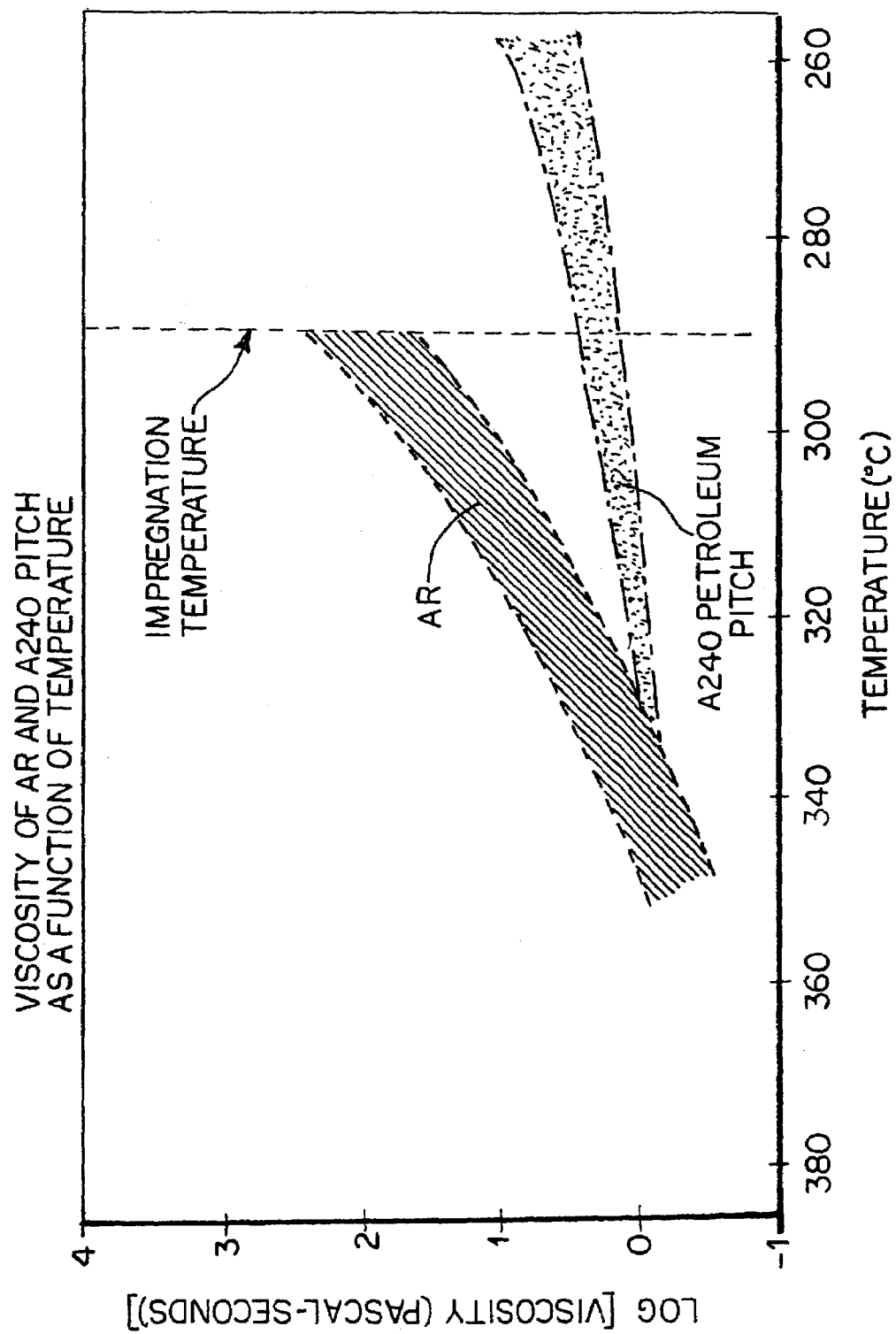
FIG. 11 shows the relationship between viscosity and temperature of AR resin.
Figure 12:
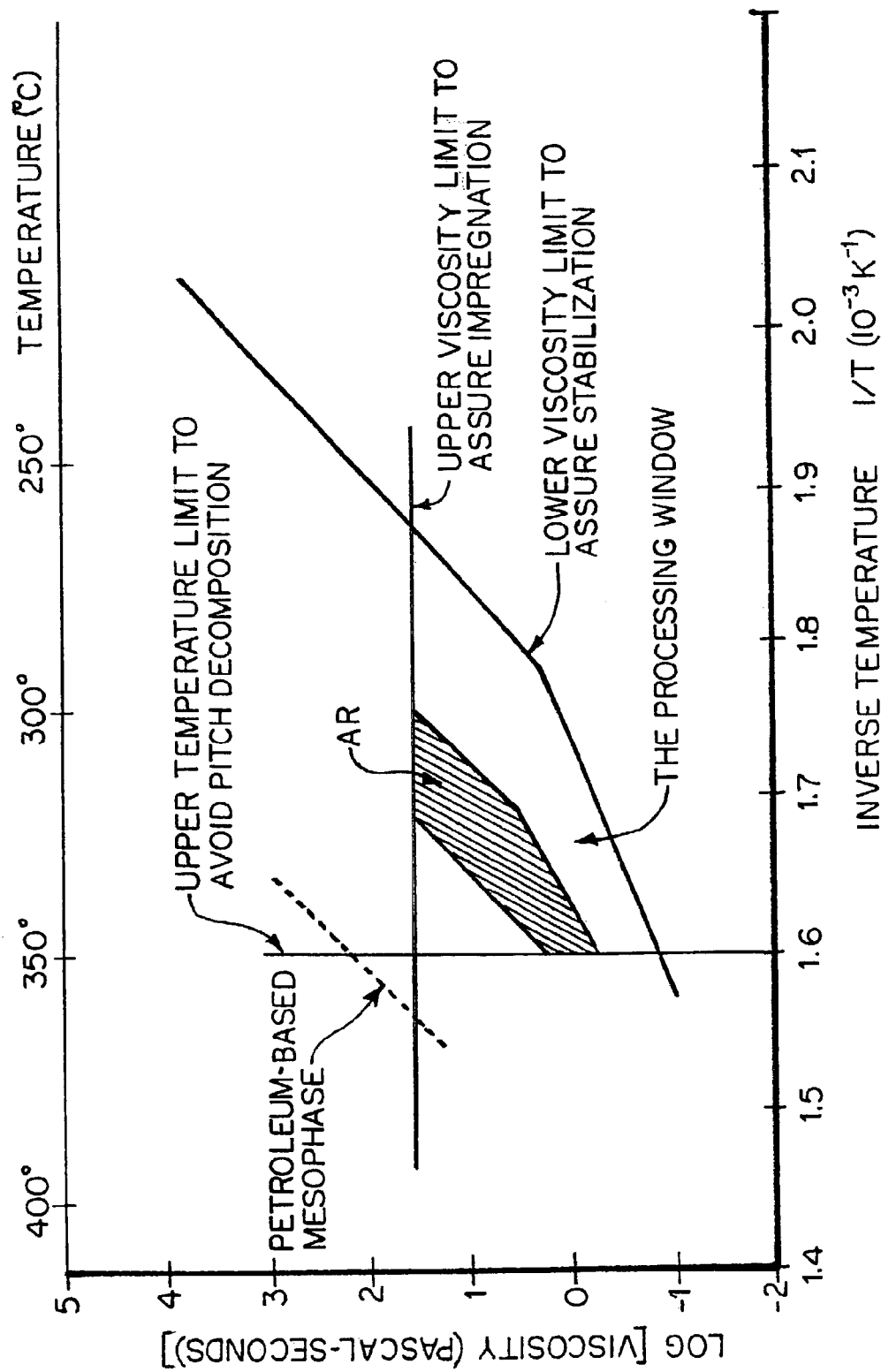
FIG. 12 shows the range of temperature and viscosity appropriate for pitch impregnation.

AR mesophase pitch has a higher viscosity (at temperatures up to and below the impregnation temperature 290° C.), than conventional commercially available pitch impregnants, e.g. A240 See FIG. 11). Although its viscosity is high relative to A240, it is still low enough (>1.5 pa s) to allow for complete infiltration into a preheated preform using the present invention. An added benefit of the relatively high viscosity of AR is that the pitch solidifies rapidly upon cooling to temperatures <290° C. This enables one to increase the throughput rate of parts through the RTM process. The viscosity versus temperature curve for AR falls within the 'processing window' as identified by White and Gopalakrishan (see FIG. 12) (J. L. White and M. K. Gopalakrishnan, Extended Abstracts of 20$^{th}$ Bienial Conference on Carbon, 1991, 184). In addition to its high viscosity, AR pitch when oxidatively stabilized has a high carbon yield (i.e. >85 wt. %). It is these combination of properties that differentiate AR pitch from others pitch impregnants; this present invention (i.e. RTM) effectively utilizes these unique combination of properties.

A number of ingredients can be, for example, phosphorous, boron and silicon based compounds added to the resin or pitch. These ingredients can include blowing agents, carbon, graphite, ceramics, antioxidants, crosslinking agents, clays and silicates. Nitrogen gas is a typical blowing agent, other blowing agents may also be used.

The apparatus and method of embodiments of the present invention pertains to the ability to infiltrate a part with a high viscosity thermoplastic resin such as mesophase pitch. In the background art, low viscosity thermoset resins were typically used. The preform can have from 20–70% porosity. The method of an embodiment of the present invention involves placing a porous preform into a mold, followed by evacuating the mold prior to injection. A vacuum can also be applied to the mold during injection. Alternately, no vacuum can be used. The preform can be preheated or heated within the mold. Molten pitch is then injected into the mold to densify the preform. The resin is allowed to cool inside the mold. The impregnated preform is then removed from the mold.

The mold can be treated with a release agent to facilitate removal of the densified preform. An effective release agent is Release Coating 854, available from Huron Technologies, Inc. Other commercially available release agents may be effective as well.

EXAMPLE 3

The injection molding apparatus described in FIG. 2 was used. The hydraulic press has a 500 ton clamping capability. The accumulator has a theoretical volume of 847 cubic inches (13,880 cm$^3$), and the measured volume using resin is about 830 cubic inches (13,601 cm$^3$). When completely filled with AR pitch resin, the accumulator contains approximately 37 lb. (16.8 kg) of resin. Temperatures in the extruder can be measured at 6 locations in the extruder barrel, the extruder head, the flow adapter, the accumulator head, the accumulator, the dump valve, the dump pipe, the melt pipe, the nozzle block, the nozzle extension and the feed throat. Heat is supplied to the extruder by an electrical heater and the mold is heated by hot oil circulation. The extruder screw creates pressure within the resin melt, and the pressure is maintained in the accumulator.

The part was preheated to 707° F. (350° C.) in an oven and transferred into the mold cavity just prior to infiltration. Keeping the part above the melting point during injection allows pitch to flow throughout the preform. This also requires pressures to be maintained for several minutes to allow pitch to infiltrate the small pores. In this example, the pitch was extruded directly into the mold, rather than using the accumulator to inject the molten resin, in order to simulate the smaller scale experiments conducted using the Killion extruder.

Infiltration of AR mesophase pitch was performed on a porous non-woven fiber preform that had been previously subjected to 200 hours of CVD densification.

The initial preform dimensions and weights are as follows: Thickness=0.875 in. (2.2 cm), ID=10.9 in. (27.7 cm), OD=18.6 in. (47.2 cm), weight=7.04 lb. (3193 g), density=0.046 lb/in$^3$.

Temperature Profile—Wilmington Structural Injection Molding Machine:

Feed End. =

| | | |
|---|---|---|
| 460° F. (238° C.) Barrel | 580° F. (304° C.) Ext. Head | 572° F. (300° C.) Dump Valve |
| 530° F. (277° C.) Barrel | 580° F. (304° C.) Flow adapter | 572° F. (300° C.) Dump Pipe |
| 550° F. (288° C.) Barrel | 580° F. (304° C.) Accumulator Head | 572° F. (300° C.) Melt Pipe |
| 572° F. (300° C.) Barrel | 580° F. (304° C.) Accumulator | 572° F. (300° C.) Nozzle Block |
| 572° F. (300° C.) Barrel | | 560° F. (293° C.) Nozzle Ext. |
| 580° F. (304° C.) Barrel | | 120° F. (49° C.) Feed Throat |

Resin was extruded directly into the preheated part. Backpressure on the accumulator was used to maintain mold cavity pressure during infiltration. The screw was rotated at 30 rpm, yielding an initial infiltration pressure of 1900 psi (13.1 MPa), decreasing to 1680 psi (MPa) at the end of the 15 minute infiltration period. A 0.125 inch (3.2 mm) diameter vent port was used on the mold. The hot oil circulator was set at 580° F. (304° C.). The final weight of the preform was 9.25 lb. (4196 g). The final density of the preform impregnated with AR pitch was 0.061 lb/in$^3$ (1.69 g/cc).

EXAMPLE 4

The apparatus described in FIG. 2 and in Example 3 was used. AR mesophase pitch was infiltrated into a porous non-woven fibrous preform previously subjected to one cycle of CVD densification. The porous preform is typical of that used as an aircraft brake disc, with the following dimensions: 19.90 inch (50.55 cm) OD, 12.32 inch (31.29 cm) ID and 0.875 inch (2.22 cm) thickness. The extruder temperature profile was as follows:

Temperature Profile

Feed section =

| | |
|---|---|
| 460° F. (238° C.) Barrel | 576° F. (302° C.) Accumulator Head |
| 530° F. (277° C.) Barrel | 576° F. (302° C.) Accumulator |
| 565° F. (296° C.) Barrel | 572° F. (300° C.) Dump Valve |
| 572° F. (300° C.) Barrel | 572° F. (300° C.) Dump Pipe |
| 572° F. (300° C.) Barrel | 572° F. (300° C.) Melt Pipe |
| 576° F. (302° C.) Barrel | 545° F. (285° C.) Nozzle Block |
| 576° F. (302° C.) Extruder Head | 545° F. (285° C.) Nozzle Extension |
| 576° F. (302° C.) Flow Adapter | 120° F. (49° C.) Feed Throat |

The mold temperature was 560° F. (293° C.) and the preform was preheated to 716° F. (380° C.). The extruder screw was rotated at 30 rpm, and the 830 in$^3$ (13,604 cc) accumulator was filled 47% full. The accumulator was discharged in 18–20 seconds, filling the mold and preform. A maximum pressure of 2400 psi (16.6 Mpa) was reached towards the end of the accumulator discharge. A 0.062 inch (1.6 mm) vent port was located on the side of the mold, as shown in FIG. 6. Initially volatiles were discharged from the vent port, followed by molten pitch. After infiltration, the part was cooled for 10 minutes to solidify the resin and removed from the mold. The preform had an initial weight of 8.77 pounds (3986 g) and an initial density of 0.050 lb/in$^3$ (1.39 g/cc). After infiltration, the preform weight was 10.40 pounds (4727g) and density was 0.062 lb/in$^3$ (1.72 g/cc). The infiltrated preform was cut in half. The preform appeared to be well filled except for a small uninfiltrated area near the preform center.

EXAMPLE 5

Impregnation of multiple preforms was demonstrated using the apparatus described in FIG. 2 and Example 3. Two nonwoven preforms subjected to one cycle of CVD were infiltrated using AR pitch. The two preforms were stacked on top of each other, with small pieces of high temperature gasket material (1 inch (2.54 cm) circles) separating the parts to allow resin to flow around the preforms, as shown in FIGS. 9 and 10). Gasket pieces 0.125 inches (3.2 mm) thick were used between the preforms and the mold surfaces, and 0.062 inch (1.6 mm) thick gaskets were used between the two preforms.

The extruder screw was rotated at 30 rpm and the accumulator was charged to 90% full. The accumulator was discharged in approximately 40 seconds, achieving a maximum pressure of 2750 psi (18.96 Mpa) at the end of the infiltration. The infiltrated preforms were cooled in the mold for 10 minutes to solidify the molten resin. The preform weights and densities before and after infiltration were as follows:

TABLE 1

| | Preform 1 | Preform 2 |
|---|---|---|
| Initial Weight | 6.93 pounds (3143 g) | 7.11 pounds (3225 g) |
| Initial Density | 0.045 lb/in$^3$ (1.24 g/cc) | 0.046 lb/in$^3$ (1.27 g/cc) |
| Final Weight | 9.29 pounds (4214 g) | 9.33 pounds (4232 g) |
| Final Density | 0.060 lb/in$^3$ (1.65 g/cc) | 0.060 lb/in$^3$ (1.67 g/cc) |

EXAMPLE 6

Impregnation of a carbon foam such as that described in U.S. Patent (hybrid foam patent) was demonstrated using the apparatus described in FIG. 2 and Example 3. The foam preform was infiltrated by extruding the molten pitch resin directly into the mold containing the preform. The bulk density of the foam preform was 0.032 lb/in$^3$ (0.89 g/cc) before infiltration and 0.057 lb/in$^3$ (1.57 g/cc) after infiltration.

EXAMPLE 7

Impregnation of a preform comprised of chopped PAN-based carbon fiber and carbonized mesophase pitch such as that described in U.S. Patent (air-blown patent) was demonstrated using the apparatus described in FIG. 2 and Example 3.

The extruder run conditoins were as follows:

| | |
|---|---|
| 460° F. (238° C.) Barrel | 580° F. (304° C.) Accumulator Head |
| 530° F. (277° C.) Barrel | 580° F. (304° C.) Accumulator |
| 560° F. (293° C.) Barrel | 572° F. (300° C.) Dump Valve |
| 572° F. (300° C.) Barrel | 576° F. (302° C.) Dump Pipe |
| 576° F. (302° C.) Barrel | 580° F. (304° C.) Melt Pipe |
| 580° F. (304° C.) Barrel | 580° F. (304° C.) Nozzle Block |
| 580° F. (304° C.) Extruder Head | 565° F. (296° C.) Nozzle Extension |
| 580° F. (304° C.) Flow Adapter | 120° F. (49° C.) Feed Throat |

Prior to extrusion, the AR pitch resin was dried in a Conair resin loading/drying system for approximately 4 hours at 190° F. (88° C.). The extruder screw was rotated at 30 rpm and the accumulator was charged to 54% full. The accumulator was discharged in 20–22 seconds, reaching an injection pressure of 1800 psi (12.41 Mpa) at the end of the infiltration.

The dimension of the preform was 18.42 inch (46.79 cm) OD, 9.79 inch (24.87 cm) ID and 1.21 inch (3.07 cm) thickness. The starting weight and density was 9.49 pounds (4305 g) and 0.041 lb/in$^3$ (1.14 g/cc), respectively. The weight and density after RTM infiltration was 13.28 pounds (6023 g) and 0.057 lb/in$^3$ (1.59 g/cc), respectively.

EXAMPLE 8

In all previous examples, dissection of the preform after RTM infiltration has revealed a small, uninfiltrated region (dry spot) near the center of the annular ring preform. This dry spot is thought to occur because the mold allows the resin to encapsulate the preform on all sides, and infiltrate from the outside surfaces towards the center. The high viscosity pitch does not allow the air originally contained within the preform to escape through the resin to the exterior of the part. The following example demonstrates the use of a mold having the configuration set forth in FIG. 3 to eliminate the dry spot by controlling the flow of resin around and through the preform.

The apparatus described in FIG. 2 and Example 3 was used. The extruder temperature profile was as follows:

| Feed section = | |
|---|---|
| 460° F. (238° C.) Barrel | 580° F. (304° C.) Accumulator Head |
| 530° F. (277° C.) Barrel | 580° F. (304° C.) Accumulator |
| 565° F. (296° C.) Barrel | 565° F. (296° C.) Dump Valve |
| 572° F. (300° C.) Barrel | 580° F. (304° C.) Dump Pipe |
| 576° F. (302° C.) Barrel | 580° F. (304° C.) Melt Pipe |
| 580° F. (304° C.) Barrel | 580° F. (304° C.) Nozzle Block |
| 580° F. (304° C.) Extruder Head | 565° F. (296° C.) Nozzle Extension |
| 580° F. (304° C.) Flow Adapter | 120° F. (49° C.) Feed Throat |

The extruder screw was rotated at 20 rpm. The mold was heated to 450° F. (230° C.). Prior to infiltration, the preforms were preheated to 752° F. (400° C.) in an air-circulating oven. The mold surfaces were shimmed open 0.040 inches (1.2 mm) to allow renting of air and volatiles at the mold OD. The accumulator was filled to 25% full, then emptied in approximately 20–25 seconds into the mold cavity to effect impregnation. The infiltrated preform was then cooled in the mold for 15 minutes to solidify the resin, and removed. Three nonwoven preforms subjected to one cycle of CVD were infiltrated under these conditions. The disc ID was 12.32 inches (31.20 cm), OD was 19.90 inches The data before and after infiltration is shown below:

The resin pressures attained during mold fill for Nos. 1, 2 and 3 were approximately 1800 psi, 1400 psi and 1900 psi, respectively. Each part was sectioned into 16 roughly equal segments after infiltration. No uninfiltrated regions were found.

A major advantage of using RTM infiltration over conventional densification technologies (e.g. CVD) is that the open porosity inside of the part is entirely filled by the resin, rather than being coated by a thin layer of CVD. When producing a carbon/carbon composite end product, however, the resin must be pyrolyzed to remove any non-carbon containing elements. If a thermoplastic, high carbon yielding resin such as AR pitch is used for infiltration, two options are available for pyrolysis. If the infiltrated part were simply heated up to pyrolysis temperature, the resin would remelt, and exude from the part. One option is to pyrolyze using hot isostatic pressurization (HIP). In this method the part must be place into a container, and the equipment is inherently expensive and requires many safety considerations. Another option involves heating the resin infiltrated part in an oxygen containing atmosphere to a temperature below the resin softening point, typically between 302° F. (150° C.) and 464° F. (240° C.). The oxygen reacts with the resin, essentially cross linking the resin. As the oxygen reacts with the resin, oxygen is adsorbed into the material, and its weight increases. If the resin adsorbs a suitable amount of oxygen, the infiltrated part can be raised to pyrolysis temperatures without melting the resin, and without exuding any resin from the interior of the part. The following is an example of successfully stabilizing and carbonizing an RTM infiltrated disc.

EXAMPLE 9

Six nonwoven aircraft brake disc preforms were subjected to one cycle of CVD densification, followed by RTM infiltration as described in examples 7 and 8. The results after infiltration are as follows:

TABLE 3

| Serial Number | Pre RTM Density | Post RTM Density |
|---|---|---|
| K93-252-411 | 0.049 lb/in$^3$ (1.35 g/cc) | 0.062 lb/in$^3$ (1.72 g/cc) |
| K93-252-412 | 0.049 lb/in$^3$ (1.35 g/cc) | 0.062 lb/in$^3$ (1.72 g/cc) |
| K93-252-419 | 0.049 lb/in$^3$ (1.37 g/cc) | 0.062 lb/in$^3$ (1.72 g/cc) |
| K93-252-420 | 0.049 lb/in$^3$ (1.36 g/cc) | 0.062 lb/in$^3$ (1.72 g/cc) |
| K93-252-427 | 0.049 lb/in$^3$ (1.35 g/cc) | 0.062 lb/in$^3$ (1.71 g/cc) |
| K93-252-428 | 0.049 lb/in$^3$ (1.35 g/cc) | 0.062 lb/in$^3$ (1.72 g/cc) |

Subsequent to resin infiltration, the discs were placed in an air-circulating oven at 338° F. (170° C.) for a period of 18 days. The degree of stabilization is measured by determining the percentage of weight

TABLE 2

| Serial Number | Pre RTM Weight | Pre RTM Density | Post RTM Weight | Post RTM Density |
|---|---|---|---|---|
| 98-918-10 | 9.78 lb (4438 g) | 0.041 lb/in$^3$ (1.14 g/cc) | 14.14 lb (6415 g) | 0.060 lb/in$^3$ (1.64 g/cc) |
| 98-918-11 | 9.91 lb (4496 g) | 0.042 lb/in$^3$ (1.15 g/cc) | 14.16 lb (6425 g) | 0.060 lb/in$^3$ (1.64 g/cc) |
| 98-918-12 | 10.32 lb (4683 g) | 0.044 lb/in$^3$ (1.20 g/cc) | 14.38 lb (6525 g) | 0.061 lb/in$^3$ (1.67 g/cc) |

$$\% \ OMG = \left(\frac{S-R}{R-P}\right) * 100$$

gain relative to the amount of resin in the part:
Where:
P=disc weight before RTM infiltration
R=disc weight after RTM infiltration
S=disc weight after oxygen stabilization After stabilization the discs were carbonized (pyrolized) to a temperature of 1652° F. (900° C.) in a nitrogen atmosphere. The results of the stabilization and carbonization are as follows:

TABLE 4

| Serial Number | Post RTM Density | % OMG | Post Carbonization Density | Carbon Yield (%) |
|---|---|---|---|---|
| K93-252-411 | 0.062 lb/in³ (1.72 g/cc) | 10.02 | 0.060 lb/in³ (1.66 g/cc) | 85.75 |
| K93-252-412 | 0.062 lb/in³ (1.72 g/cc) | 9.12 | 0.060 lb/in³ (1.66 g/cc) | 85.12 |
| K93-252-419 | 0.062 lb/in³ (1.72 g/cc) | 9.59 | 0.060 lb/in³ (1.67 g/cc) | 85.69 |
| K93-252-420 | 0.062 lb/in³ (1.72 g/cc) | 9.95 | 0.060 lb/in³ (1.67 g/cc) | 85.89 |
| K93-252-427 | 0.062 lb/in³ (1.71 g/cc) | 10.37 | 0.060 lb/in³ (1.66 g/cc) | 85.60 |
| K93-252-428 | 0.062 lb/in³ (1.72 g/cc) | 10.28 | 0.060 lb/in³ (1.66 g/cc) | 85.55 |

After being carbonized to a temperature of 1652° F. (900° C.), the discs did not show any visible signs of resin exuding from the discs interior during the heating process. Samples were taken from the discs and observed using polarized light microscopy. The microstructure through the entire disc thickness can be characterized using this technique. Again, no signs of pitch melting were evident via microscopic observation.

EXAMPLE 10

Two discs that had been through one CVD and one RTM, oxidative stabilization and carbonization cycle were infiltrated a second time using RTM. The mold setup, temperatures and injection parameters were identical to those in Example 9 except that the shot size was 17% in this case. The two discs had the following geometrical dimensions: 12.37 inch (31.42 cm) ID, 19.85 inch (50.42 cm) OD and 1.22 inch (3.10 cm) thickness. The results for these two parts are listed in Table 5.

TABLE 5

Results for second cycle injection RTM molding.

| Serial Number | Pre RTM Weight | Pre RTM Density | Post RTM Weight | Post RTM Density |
|---|---|---|---|---|
| 98-928-6 | 14.16 lb. (6422 g) | 0.062 lb/in³ (1.71 g/cc) | 15.45 lb. (7010 g) | 0.068 lb/in³ (1.89 g/cc) |
| 98-928-25 | 14.27 lb. (6474 g) | 0.061 lb/in³ (1.70 g/cc) | 15.75 lb. (7145 g) | 0.067 lb/in³ (1.86 g/cc) |

When producing carbon/carbon composites, e.g. aircraft brake disc production, the densification process typically requires 3–5 infiltration cycles using either CVD or resin infiltration taking up to several months to complete. A disadvantage of densification using repeated CVD infiltration cycles is that the pyrolytic carbon deposits as a layer on the surfaces of available open porosity. During the infiltration cycle, the surface pores tend to close off. As a result, the discs are removed from the CVD furnace and the surfaces are machined to open up the internal porosity. The effectiveness of the intermediate machining step diminishes as the number of CVD infiltrations increases . . .

EXAMPLE 11

Eleven nonwoven preforms were processed through one cycle of CVD densification, one cycle of RTM infiltration and carbonization as described in Example 9, followed by an additional CVD densification cycle. The disc densities before RTM, after carbonization and after the final CVD cycle are shown in Table 6.

TABLE 6

| Serial Number | Pre RTM Density | Post Carbonization Density | Post 2nd CVD Density |
|---|---|---|---|
| 97-918-413 | 0.047 lb/in³ (1.30 g/cc) | 0.060 lb/in³ (1.65 g/cc) | 0.065 lb/in³ (1.79 g/cc) |
| 97-919-413 | 0.045 lb/in³ (1.25 g/cc) | 0.059 lb/in³ (1.62 g/cc) | 0.064 lb/in³ (1.78 g/cc) |
| 97-919-414 | 0.045 lb/in³ (1.24 g/cc) | 0.059 lb/in³ (1.62 g/cc) | 0.065 lb/in³ (1.79 g/cc) |
| 97-919-415 | 0.045 lb/in³ (1.24 g/cc) | 0.059 lb/in³ (1.62 g/cc) | 0.064 lb/in³ (1.77 g/cc) |
| 97-918-701 | 0.044 lb/in³ (1.22 g/cc) | 0.057 lb/in³ (1.59 g/cc) | 0.065 lb/in³ (1.79 g/cc) |
| 97-918-901 | 0.045 lb/in³ (1.24 g/cc) | 0.057 lb/in³ (1.59 g/cc) | 0.066 lb/in³ (1.82 g/cc) |
| 98-928-20 | 0.053 lb/in³ (1.47 g/cc) | 0.062 lb/in³ (1.72 g/cc) | 0.066 lb/in³ (1.84 g/cc) |
| 98-928-21 | 0.053 lb/in³ (1.47 g/cc) | 0.062 lb/in³ (1.72 g/cc) | 0.066 lb/in³ (1.84 g/cc) |
| 98-928-22 | 0.053 lb/in³ (1.46 g/cc) | 0.062 lb/in³ (1.71 g/cc) | 0.066 lb/in³ (1.84 g/cc) |
| 98-928-23 | 0.052 lb/in³ (1.44 g/cc) | 0.062 lb/in³ (1.72 g/cc) | 0.066 lb/in³ (1.83 g/cc) |
| 98-928-24 | 0.053 lb/in³ (1.46 g/cc) | 0.062 lb/in³ (1.72 g/cc) | 0.066 lb/in³ (1.84 g/cc) |

During the production of the nonwoven preforms, segments of fabric are needle punched together using traditional textile processing techniques. This needle punching process creates rather large porosity through the thickness of the preform, 100–200 µm wide and several hundred µm deep. The traditional process used to densify these nonwoven preforms for aircraft brake applications is CVD. Each cycle of CVD deposits a layer of pyrolytic carbon between 2–10 µm thick on the surfaces of all available open porosity. The fibers within the fabric layers are very close together (1–15 µm apart), and these regions densify very efficiently during the initial CVD cycle. However, the large porosity created by the needle punching does not densify efficiently. The density of the fibrous nonwoven preform before densification is typically 0.018 lb/in³ (0.50 g/cc). The data shown in Table 7 is a listing of typical densities measured after one, two, three and four cycles of CVD for discs of the same size as those listed in Table 6.

TABLE 7

| CVD Cycle | Density |
|---|---|
| 0 | 0.018 lb/in³ (0.50 g/cc) |
| 1 | 0.043 lb/in³ (1.20 g/cc) |
| 2 | 0.053 lb/in³ (1.48 g/cc) |

TABLE 7-continued

| CVD Cycle | Density |
|---|---|
| 3 | 0.060 lb/in³ (1.66 g/cc) |
| 4 | 0.062 lb/in³ (1.72 g/cc) |

As shown in Table 7, the density increase becomes less with each successive CVD cycle. This is due to the fabric regions becoming completely filled with CVD and the larger porosity being coated with layers of CVD, but never being completely filled. The RTM process completely fills all available open porosity with a carbon precursor resin, including the large pores created by needle punching. When the resin is carbonized, the density of the coke (carbonized pitch) increases and volatiles are given off with a corresponding loss in weight (approximately 85% carbon yield as shown in example 9). The increase in density and loss of weight leads to an overall decrease in volume, which creates internal porosity within the part. While the carbonized pitch does not completely fill the large porosity created by needle punching, it does reduce the overall open pore volume while creating additional internal surface area for subsequent CVD deposition. As shown by the data in Table 6, significantly higher final densities can be achieved densifying these nonwoven preforms with a combination of RTM and CVD versus all CVD densification.

After the preforms are infiltrated with the mesophase pitch resin, they can be subjected to follow on processing to convert the organic resin into carbon which forms part of the carbon matrix in a carbon/carbon composite material. The infiltrated discs are subjected to a process commonly referred to as oxidative stabilization. The pitch is a thermoplastic, and upon heating to a temperature sufficient to carbonize the material, the resin would remelt, bloat, and foam. The parts are placed in an air-circulating oven at a temperature between 150 and 240° C., typically 170° C. The oxygen reacts with the pitch and cross-links the resin, essentially converting it into a thermoset. This process is used in the manufacture of pitch based carbon fibers. The completion of the process is measured in terms of mass gain, since the oxygen reacts with the pitch, it is adsorbed, thereby increasing the overall weight. When the weight gain of the pitch only is measured (post part weight–pre part weight), an oxygen mass gain level of 8.5% is sufficient. Parts with OMG (oxygen mass gain) levels of between 8% and 12% have been successfully carbonized.

After stabilization, the part can be carbonized by heating in an inert atmosphere furnace to a temperature above 650° C. (1202° F.). Carbonization is typically performed at 900° C. (1652° F.). After carbonization, the part can be heat treated (graphitized) before further processing, but this step is not necessarily a requirement. Typical heat treatment temperatures are in a range of 1600–2500° C. (2912–4532° F.), with 1800° C. (3272° F.) being preferred. The part can then be further densified using either CVD or RTM of high char yielding, high viscosity resins as shown in the examples above.

It is understood that the foregoing description and specific embodiments shown herein are merely illustrative of the best mode of the invention and the principles thereof, and that modifications and additions may easily be made to the apparatus and method by those skilled in the art without departing from the spirit and scope of the invention, which is therefore understood to be limited only by the scope of the appended claims.

The invention claimed is:

1. A rapid resin or pitch transfer molding apparatus containing a porous preform to be impregnated with melted resin or pitch, said apparatus comprises:
   a conveying arrangement for conveying a melted resin or pitch;
   a mold receiving the melted resin or pitch, the mold comprising:
      a top half;
      a bottom half opposed to the top half so that the top half and the bottom half form a mold cavity;
      at least one gate disposed in the top half or the bottom half; and
      protrusions therein for effecting a pressure gradient and flow of the resin or pitch from an inner area of the mold toward an outer area of the mold;
   a constraining component disposed at the mold to constrain the mold during injection of the resin or pitch into the mold; and
   wherein said porous preform is located in the mold.

2. The rapid resin or pitch transfer molding apparatus according to claim 1, further comprising an accumulator located prior to the mold.

3. The rapid resin or pitch transfer molding apparatus according to claim 2, wherein the accumulator is a hydraulically actuated piston accumulator.

4. The rapid resin or pitch transfer molding apparatus according to claim 1, wherein the mold is contained within the constraining component for constraining the mold.

5. The rapid resin or pitch transfer molding apparatus according to claim 1, wherein the conveying arrangement for conveying the melted resin or pitch is one of a single screw extruder, a twin screw extruder, a vented twin screw extruder, and a reciprocating screw extruder.

6. The rapid resin or pitch transfer molding apparatus according to claim 4, wherein the constraining component for constraining the mold is a press.

7. The rapid resin or pitch transfer molding apparatus according to claim 1, wherein the mold further comprises:
   a valve, wherein the valve can admit resin or pitch into the gate in the top half or the bottom half; and
   an arrangement for one of venting and providing vacuum to the mold.

8. The rapid resin or pitch transfer molding apparatus according to claim 7, wherein the top half and the bottom half are separated by shim stock of about 0.005–0.040 inch.

9. The rapid resin or pitch transfer molding apparatus according to claim 7, wherein the gate is disposed in the center of a face of either the top half or the bottom half and comprises a nozzle.

10. The rapid resin or pitch transfer molding apparatus according to claim 1, wherein the protrusion is either tapered within the mold cavity or the protrusion radially extends to the outer area of the mold cavity.

11. The rapid resin or pitch transfer molding apparatus according to claim 10, wherein the protrusion comprises at least one of a vent port and vacuum port.

12. The rapid resin or pitch transfer molding apparatus according to claim 10, wherein the mold further comprises an external vent port which is channeled to the vent port.

* * * * *